United States Patent [19]

Poley et al.

[11] 3,868,271

[45] Feb. 25, 1975

[54] METHOD OF CLEANING A GLASS SUBSTRATE BY IONIC BOMBARDMENT IN A WET ACTIVE GAS

[75] Inventors: Neil M. Poley; Howard L. Whitaker, both of Kingston, N.Y.

[73] Assignee: International Business Machines Corporation, Armonk, N.Y.

[22] Filed: June 13, 1973

[21] Appl. No.: 369,620

[52] U.S. Cl. .......................................... 134/1, 117/54

[51] Int. Cl. ............................ B08b 3/00, C03c 23/00

[58] Field of Search ....... 134/1, 37, 21; 204/129.35; 117/54, 93.1 GD, 93.3

[56] References Cited

UNITED STATES PATENTS

| | | | |
|---|---|---|---|
| 2,467,953 | 4/1949 | Bancroft et al. | 134/1 |
| 2,501,563 | 3/1950 | Colbert et al. | 117/93.1 GD |
| 2,985,756 | 5/1961 | Holland | 117/54 X |
| 3,192,892 | 7/1965 | Hanson et al. | 117/93.3 X |
| 3,326,177 | 6/1967 | Taylor | 134/1 X |

OTHER PUBLICATIONS

Holland, Vacuum Deposition of Thin Films, John Wiley & Sons Inc., 1956, pp. 74–79.

*Primary Examiner*—S. Leon Bashore
*Assistant Examiner*—Richard V. Fisher
*Attorney, Agent, or Firm*—Edward S. Gershuny

[57] ABSTRACT

An improved method of cleaning a glass substrate prior to evaporation of chrome metal electrodes upon it. The substrate is cleaned by the use of glow discharge in a wet active gas, preferably air or forming gas.

8 Claims, 1 Drawing Figure

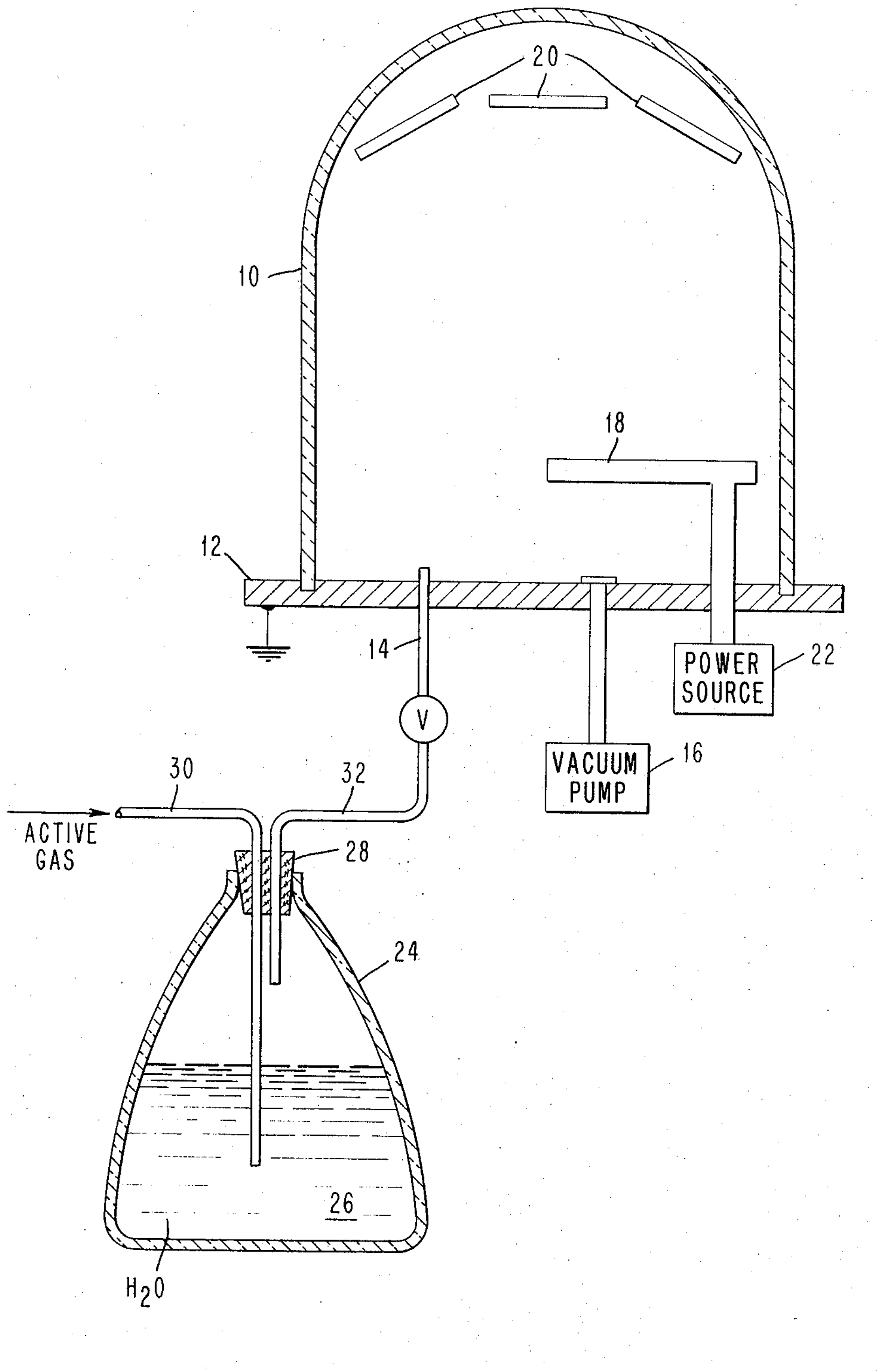
20
10
18
12
14
V
22
POWER SOURCE
16
VACUUM PUMP
30
32
ACTIVE GAS
28
24
26
H2O

METHOD OF CLEANING A GLASS SUBSTRATE BY IONIC BOMBARDMENT IN A WET ACTIVE GAS

DETAILED DESCRIPTION

Introduction

The invention relates to a method for cleaning a glass substrate. More particularly, the invention is directed to cleaning the glass surface of a substrate prior to evaporation of chrome metal electrodes upon the substrate.

As part of a process for manufacturing a gas panel display, one of the steps typically involves evaporation of chrome metal electrodes onto a glass substrate. However, prior to the evaporation step, it is necessary that the surface of the substrate be cleaned.

One known method for cleaning a substrate is to use a chemical etchant which will remove surface contaminants without attacking the substrate itself. One drawback to this method is that different substrates require different etchants for cleaning them. Because of this, and other drawbacks, chemical cleaning is seldom used.

Two other cleaning techniques that are in more prevelant use both involve cleaning the substrate in a controlled low-presssure atmosphere.

The first of these comprises the step of heating the substrate to a high temperature, typically around 250°C, before depositing the chrome layer. However, in order to prevent damage to the glass substrate, the substrate must be heated and cooled at a relatively low rate, approximately 1°C per minute. For this reason, it was not unusual for a total time of eight hours or more to be required for the preparatory cycle to merely bring the substrate to the required temperature and to cool it. This extremely lengthy time is generally not satisfactory.

Another approach to cleaning is positive ion bombardment. When positive ions, moving at high velocities, collide with the surface of a workpiece, they remove material from it. Thus, for example, the workpiece may be cleaned by placing it on a cathode in a low pressure noble gaseous ambient and applying a high constant voltage between the cathode and an anode. (Techniques which utilize alternating currents are also known.) Ions, which are formed by collisions between electrons accelerated from the cathode and noble gas atoms, bombard the workpiece surface. In the prior art, this technique, which is known as glow discharge, utilizes a dry inert gas ambient. In the prior art, water is generally regarded as a contaminant.

It is an object of this invention to provide an improved method for cleaning a substrate, said method utilizing a glow discharge technique.

A more particular object of the invention is to provide an improved glow discharge method for cleaning a glass substrate which will result in a surface to which an evaporated chromium film will have a greater adhesion.

SUMMARY OF THE INVENTION

In accordance with one embodiment of this invention, the above and other objects are accomplished by utilizing glow discharge techniques in a wet active gas atmosphere of air or forming gas (nitrogen and hydrogen). The atmosphere is saturated with water vapor at room temperature (approximately 22°C) by bubbling air through water in an appropriate container.

The primary advantage of this invention is that it can be used to clean the surface of a glass substrate and that the surface of the substrate will then be in such a condition that there will be increased adhesion between the substrate and a chrome film which is subsequently evaporated onto it.

Another advantage of the invention is that it utilizes room air for the glow discharge atmosphere. Thus, there is no need for a source of special or purified gas.

The above and other objects, features and advantages of this invention will be apparent from the following description of a preferred embodiment thereof as illustrated in the accompanying drawing.

DESCRIPTION OF THE DRAWING

The drawing is a generalized showing of glow discharge apparatus which may be used in practicing the invention along with apparatus for wetting the atmosphere.

DETAILED DESCRIPTION

The preferred utilization of this invention is as part of a method of manufacturing a gas panel display. Additional details of the manufacturing process are shown in co-pending applications Ser. No. 214,348 filed on Dec. 30, 1971 (abandoned in favor of continuing application Ser. No. 405,205 filed Oct. 10, 1973) for Gas Panel Fabrication by Peter H. Haberland et al. and Ser. No. 214,151 filed on Dec. 30, 1971, now U.S. Pat. No. 3,804,609, for Improved Method of Gas Panel Construction by Thomas J. Murphy et al. Both of said applications are incorporated herein by this reference.

Various types of apparatus for ionic bombardment (glow discharge) are well known in the art and need not be completely described herein. Some types of such apparatus are described, for example, by Holland, "Vacuum Deposition of Thin films," Chapman and Hall Ltd., 1966.

Some of the essential elements of an exemplary glow discharge apparatus are shown in the FIGURE. A low-pressure gas ionization chamber is enclosed by an envelope in the form of a bell jar made of suitable material which is removably mounted on a base plate 12. A gasket (not shown) is normally disposed between the jar 10 and metal plate 12 to provide a vacuum seal. A suitable gas supplied via inlet 14 is maintained at a desired low pressure in the enclosure by means of a vacuum pump 16. The electrode 18 within the gas-filled enclosure serves as a cathode while metal plate 12 serves as an anode. (The terms "cathode" and "anode" are employed merely for convenience herein. If apparatus which utilizes an alternating current power source were to be used, the relative polarities of the plate 12 and the electrode 18 would alternate while sputter etching was performed.)

Objects to be sputter etched are mounted on fixtures 20. The fixtures are grounded (generally by electrically connecting them to the base plate 12) so that they also serve as anodes. Voltage (typically about −5KV) is applied to the electrode 18 from a power source 22.

For a description of additional details of glow discharge apparatus, and its use, reference may be made to said book by Holland which is incorporated into this specification, and to other literature and apparatus well known to those skilled in the art.

As has been discussed above, the prior art utilizes a dry inert atmosphere within the envelope 10 when practicing the glow discharge method.

This invention differs from the prior art primarily in that it utilizes a wet active atmosphere within the envelope 10. The atmosphere is preferably air or forming gas (90% nitrogen and 10% hydrogen) which is saturated with water at room temperature.

An example of apparatus which may be used to saturate the atmosphere is shown in the FIGURE. It comprises a container 24 of water 26. Through the stopper 28 of the container there extends an inlet tube 30 through which active gas is introduced into the system. Tube 30 extends into the water 26 that is inside of the container so that the gas will bubble up through the water. An outlet tube 32, which is entirely above the surface of the water also extends through the stopper 28. Gas that has entered the system through tube 30, and become saturated by being bubbled through the water in the container 24 will be fed to the glow discharge apparatus via tube 32.

When practicing this invention, it is preferred that the active atmosphere be saturated with water at room temperature (approximately 22°C). Two preferred atmospheres are room air and forming gas (90% nitrogen and 10% hydrogen). Of these atmospheres, room air is preferred. Also, in the preferred embodiment of the invention, the substrate used is a soda lime silica plate glass of the type normally used for windows and mirrors. After the substrate has been cleaned, chromium will be deposited thereon.

Although, in the above description, one type of glow discharge apparatus was described, those skilled in the art will recognize that practically any other glow discharge apparatus, utilizing either a direct current or an alternating current power source, may be used.

Also, although the invention was described with reference to two preferred atmospheres, air and forming gas, those skilled in the art will recognize that other atmospheres, such as, for example, other active gases (oxygen, nitrogen, ect.) may be used effectively. It will also be recognized that means other than that described herein may be utilized for introducing water into the atmosphere.

While the invention has been particularly shown and described with reference to preferred embodiments thereof, it will be understood by those skilled in the art that the above and other changes in form and details may be made therein without departing from the spirit and scope of the invention.

What is claimed is:

1. In a method for cleaning a glass substrate, the steps of:

placing said substrate within an ionic bombardment apparatus;

substantially filling said apparatus with a wet active gas under low pressure, said wet active gas being substantially saturated with water at 22°C; and applying an electrical potential between an anode and a cathode within said apparatus to cause ionic bombardment of said substrate in said wet active gas.

2. The method of claim 1 wherein said active gas is air.

3. The method of claim 1 wherein said active gas is forming gas.

4. The method of claim 1 wherein said active gas is made wet by the additional step of bubbling it through water prior to its introduction into said ionic bombardment apparatus.

5. The method of claim 4 wherein said active gas is forming gas.

6. The method of claim 4 wherein said active gas is air.

7. In a method for cleaning a soda lime silica glass substrate prior to deposition of chromium thereupon, the steps of:

placing said substrate within a glow discharge apparatus;

substantially saturating an active gas by bubbling it through water at approximately 22°C;

introducing said saturated active gas into said glow discharge apparatus; and causing ionic bombardment of said substrate within said glow discharge apparatus in said active gas.

8. The method of claim 7 wherein said active gas is selected from the group consisting of air and forming gas.

* * * * *